US012424805B2

(12) United States Patent
Uchiyama et al.

(10) Patent No.: US 12,424,805 B2
(45) Date of Patent: Sep. 23, 2025

(54) CONNECTOR ASSEMBLY

(71) Applicant: Japan Aviation Electronics Industry, Ltd., Tokyo (JP)

(72) Inventors: Yuichi Uchiyama, Tokyo (JP); Yoshinobu Yamamoto, Tokyo (JP); Hiroaki Honda, Tokyo (JP); Shunsuke Tasaka, Tokyo (JP)

(73) Assignee: Japan Aviation Electronics Industry, Ltd., Tokyo (JP)

( * ) Notice: Subject to any disclaimer, the term of this patent is extended or adjusted under 35 U.S.C. 154(b) by 349 days.

(21) Appl. No.: 18/315,804

(22) Filed: May 11, 2023

(65) Prior Publication Data

US 2024/0030665 A1 Jan. 25, 2024

(30) Foreign Application Priority Data

Jul. 19, 2022 (JP) ................................ 2022-114593

(51) Int. Cl.

*H01R 24/40* (2011.01)
*H01R 13/24* (2006.01)
*H01R 13/631* (2006.01)
*H01R 103/00* (2006.01)

(52) U.S. Cl.

CPC ............. *H01R 24/40* (2013.01); *H01R 13/24* (2013.01); *H01R 13/6315* (2013.01); *H01R 2103/00* (2013.01)

(58) Field of Classification Search

CPC .... H01R 13/24; H01R 13/6315; H01R 24/40; H01R 2103/00

USPC ................................ 439/578, 246, 247, 252

See application file for complete search history.

(56) References Cited

U.S. PATENT DOCUMENTS 3,864,000 A * 2/1975 Coller .................. H01R 12/737 439/246
5,334,035 A * 8/1994 Wehrle ................. H01R 13/422 439/246
5,879,177 A * 3/1999 Honma ................ H01R 24/542 439/246

(Continued)

FOREIGN PATENT DOCUMENTS

CN 111146617 A * 5/2020 ............. H01R 13/24
CN 115173124 A * 10/2022 ......... H01R 13/6315

(Continued)

*Primary Examiner* — Gary F Paumen

(74) *Attorney, Agent, or Firm* — Renner, Otto, Boisselle & Sklar, LLP

(57) ABSTRACT

A connector assembly includes a first connector and a second connector, in which the first connector includes: a first signal terminal; a first fixed part which fixes a first part of the first signal terminal; a first terminal which fixes the first signal terminal with the first fixed part held therebetween; a second fixed part which fixes a second part of the first signal terminal; and a second terminal inside which the first signal terminal is fixed with the second fixed part held therebetween, the second connector includes: a second signal terminal; a third fixed part which fixes the second signal terminal; and a third terminal which fixes the second signal terminal with the third fixed part held therebetween, and since a diameter of the bending part is smaller than a diameter of the second part, the second fixed part is caught on the second part and is retained.

6 Claims, 11 Drawing Sheets

(56) References Cited

U.S. PATENT DOCUMENTS

| | | | | | |
|---|---|---|---|---|---|
| 5,980,290 | A * | 11/1999 | Meynier | H01R 13/6315 439/246 |
| 6,497,579 | B1 * | 12/2002 | Garbini | H01R 13/6315 439/246 |
| 7,080,999 | B2 * | 7/2006 | Narui | H01R 13/6315 439/246 |
| 8,801,459 | B2 * | 8/2014 | Mrowka | H01R 24/54 439/246 |

FOREIGN PATENT DOCUMENTS

| | | | |
|---|---|---|---|
| JP | 2016-125841 | A | 7/2016 |
| JP | 2019-032267 | A | 2/2019 |

* cited by examiner

CONNECTOR ASSEMBLY

INCORPORATION BY REFERENCE

This application is based upon and claims the benefit of priority from Japanese patent application No. 2022-114593, filed on Jul. 19, 2022, the disclosure of which is incorporated herein in its entirety by reference.

BACKGROUND

The present disclosure relates to a connector assembly.

FIG. 12 is a cross-sectional view illustrating a mating connector 10 and a relay connector 20 in a floating connector 40. FIG. 13 is a cross-sectional view illustrating a connection connector 30 that is connected to the mating connector 10 via the relay connector 20 in the floating connector 40. As shown in FIGS. 12 and 13, the connection connector 30 is connected to the mating connector 10 via the relay connector 20. Accordingly, a signal terminal 31 of the connection connector 30 is connected to a signal terminal 11 of the mating connector 10 via a signal terminal 21 of the relay connector 20. A GND terminal 32 of the connection connector 30 is connected to a GND terminal 12 of the mating connector 10 via a GND terminal 22 of the relay connector 20.

SUMMARY

In the aforementioned floating connector 40, the relay connector 20 is configured to be held by only a spring contact, and thus the relay connector 20 tends to fall from the mating connector 10 when the floating connector 40 is used and while the floating connector 40 is being transported. In short, there is a problem that the connection connector 30 falls.

The present disclosure has been made in order to solve the aforementioned problem and an object of the present disclosure is to provide a connector assembly capable of preventing a connector from falling when the connector assembly is used and while the connector assembly is being transported.

According to an aspect of the present disclosure, a connector assembly includes a first connector and a second connector connected to the first connector, in which the first connector includes: a first signal terminal that is extended along a mating axis; a first fixed part which fixes a first part spaced apart from a distal end of the first signal terminal; a first terminal in which a concave part having a bottom surface and an inner peripheral surface is formed, the first terminal fixing the first signal terminal with the first fixed part being held between the first terminal and the first signal terminal in such a way that the first signal terminal projects from the bottom surface; a second fixed part which fixes a second part between the distal end of the first signal terminal and the first part; and a second terminal having a tubular shape, centered on the mating axis, and having one first opening part and another second opening part, and inside which the first signal terminal is fixed with the second fixed part being held between the first signal terminal and the second terminal, the second connector includes: a second signal terminal; a third fixed part that has a hole with which the distal end of the first signal terminal mates and fixes the second signal terminal; and a tubular third terminal which includes one third opening part and another fourth opening part and inside which the second signal terminal is fixed with the third fixed part being held between the tubular third terminal and the second signal terminal, the second connector is inserted into the second terminal from the third opening part, and since a diameter of a bending part between the first part and the second part of the first signal terminal is smaller than a diameter of the second part of the first signal terminal, the second fixed part is caught on the second part and is retained.

In the aforementioned connector assembly, the second part may include: an upper stage part centered on the mating axis; and a lower stage part centered on the mating axis and provided so as to be closer to the distal end than the upper stage part is, and a diameter of the lower stage part may be larger than a diameter of the upper stage part.

In the aforementioned connector assembly, a length of the lower stage part in the mating axis direction may be larger than a length of the upper stage part in the mating axis direction.

In the aforementioned connector assembly, the diameter of the lower stage part may be at least twice as large as the diameter of the bending part.

In the aforementioned connector assembly, a length of the first fixed part in the mating axis direction may be larger than a length of the bending part in the mating axis direction.

In the aforementioned connector assembly, the first opening part may include a diameter increasing part having elasticity, the diameter increasing part may slide on an inner peripheral surface of the concave part, and a cross-sectional shape of the inner peripheral surface of the concave part formed by a surface including the mating axis may include a part of a circumference centered on a point in the bending part.

According to the present disclosure, it is possible to provide a connector assembly capable of preventing a connector from falling when the connector assembly is used and while the connector assembly is being transported.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, with reference to the drawings, embodiments according to the present disclosure are explained hereinafter with reference to the drawings. The following explanations are given just to show preferred embodiments according to the present disclosure, and the scope of the present disclosure should not be limited to the embodiments shown below. In the following explanations, components/structures to which the same symbols are assigned are substantially equivalent to each other.

First Embodiment

Figure 1:
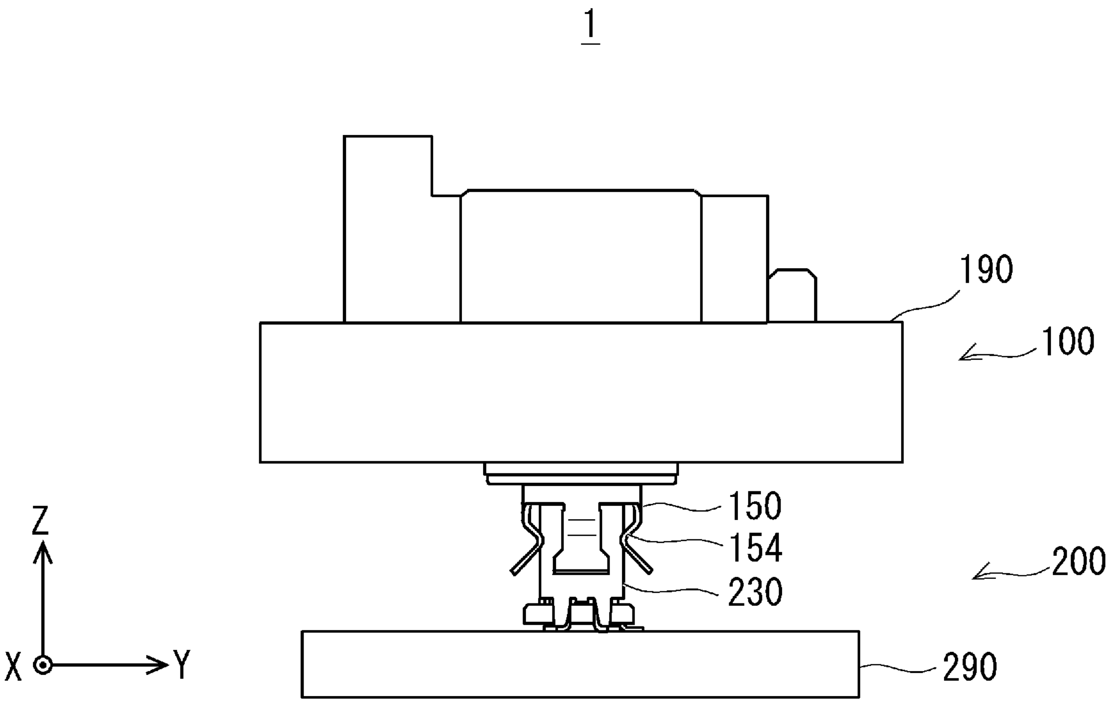
FIG. 1 is a side view illustrating a connector assembly according to a first embodiment.
Figure 2:
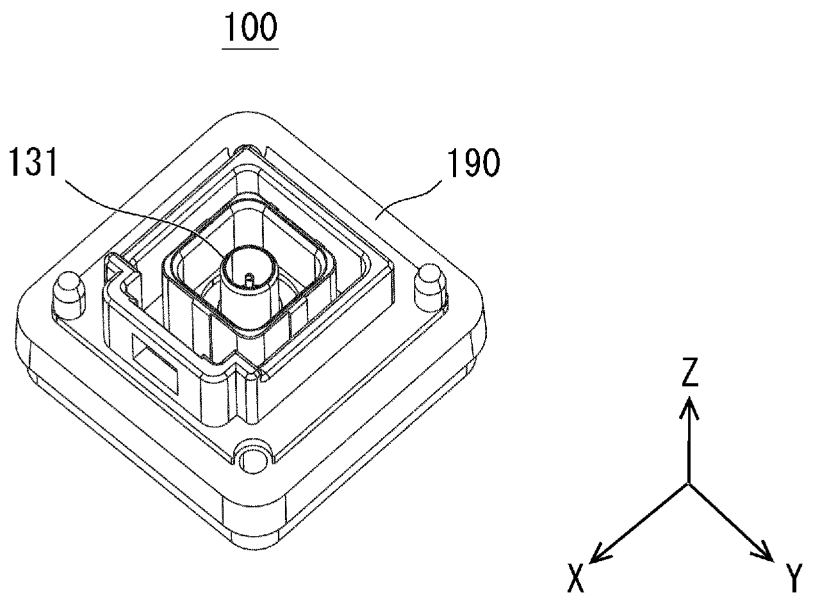
FIG. 2 is a perspective view illustrating a first connector in the connector assembly according to the first embodiment.
Figure 3:
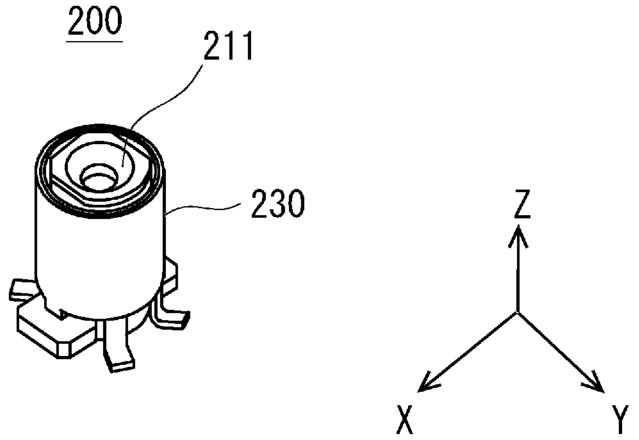
FIG. 3 is a perspective view illustrating a second connector in the connector assembly according to the first embodiment.
Figure 4:
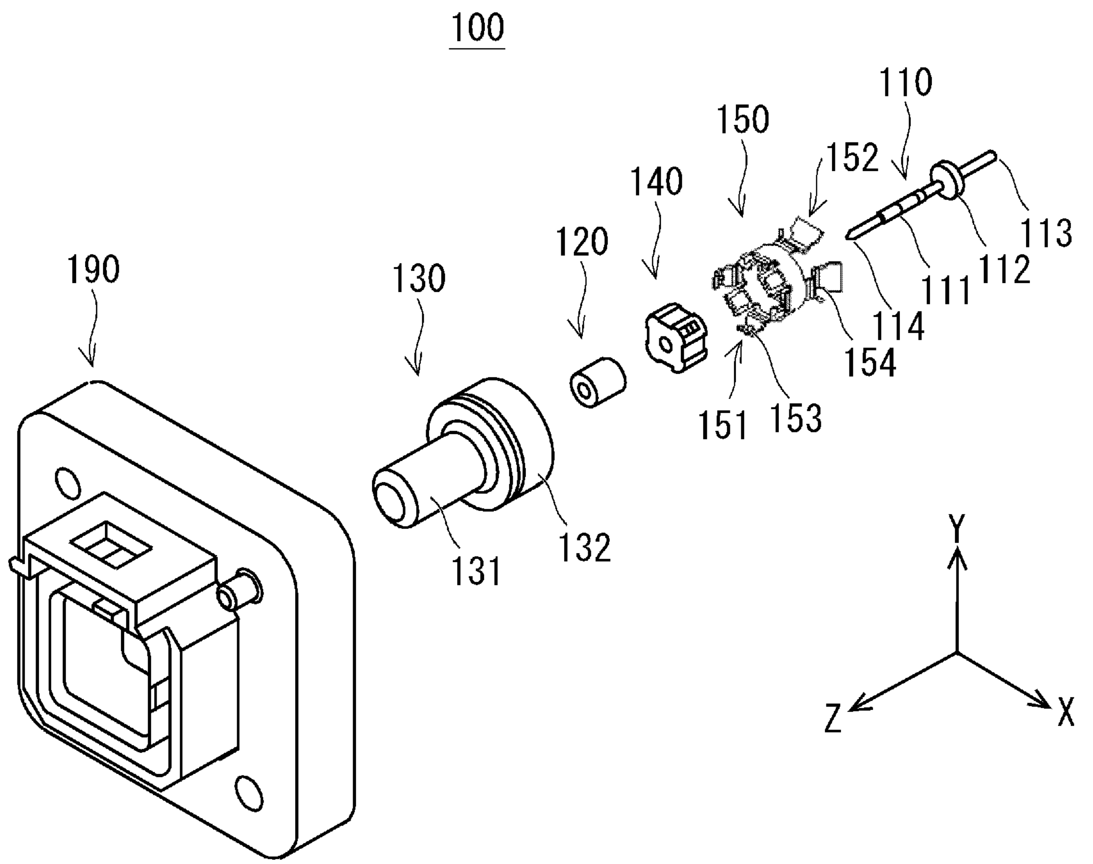
FIG. 4 is an exploded perspective view illustrating the first connector in the connector assembly according to the first embodiment.
Figure 5:
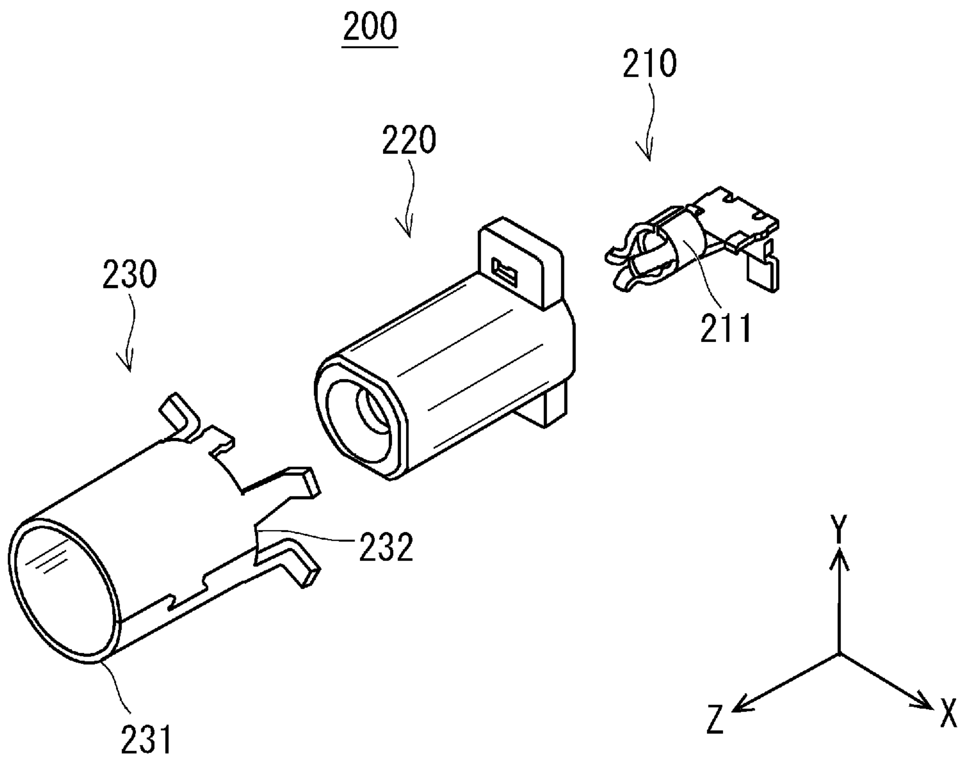
FIG. 5 is an exploded perspective view illustrating the second connector in the connector assembly according to the first embodiment.
Figure 6:
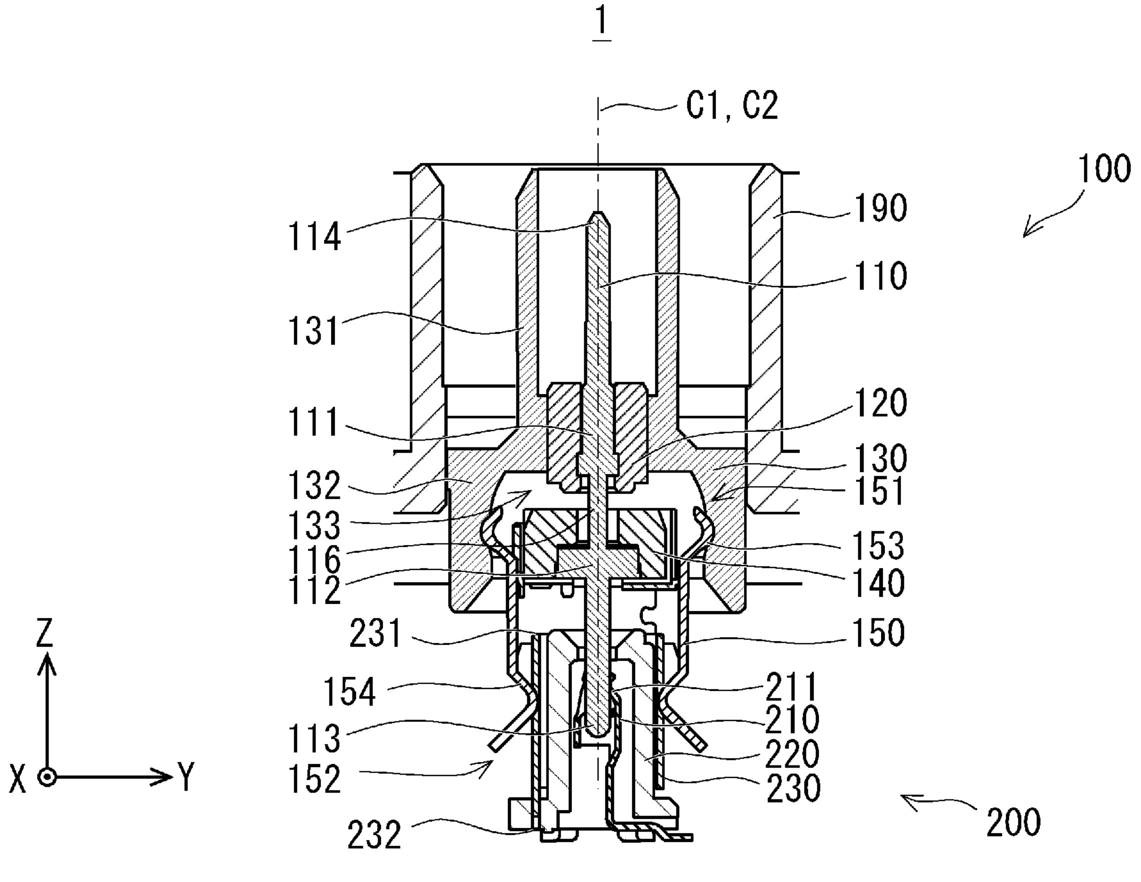
FIG. 6 is a cross-sectional view illustrating the connector assembly according to the first embodiment.
Figure 7:
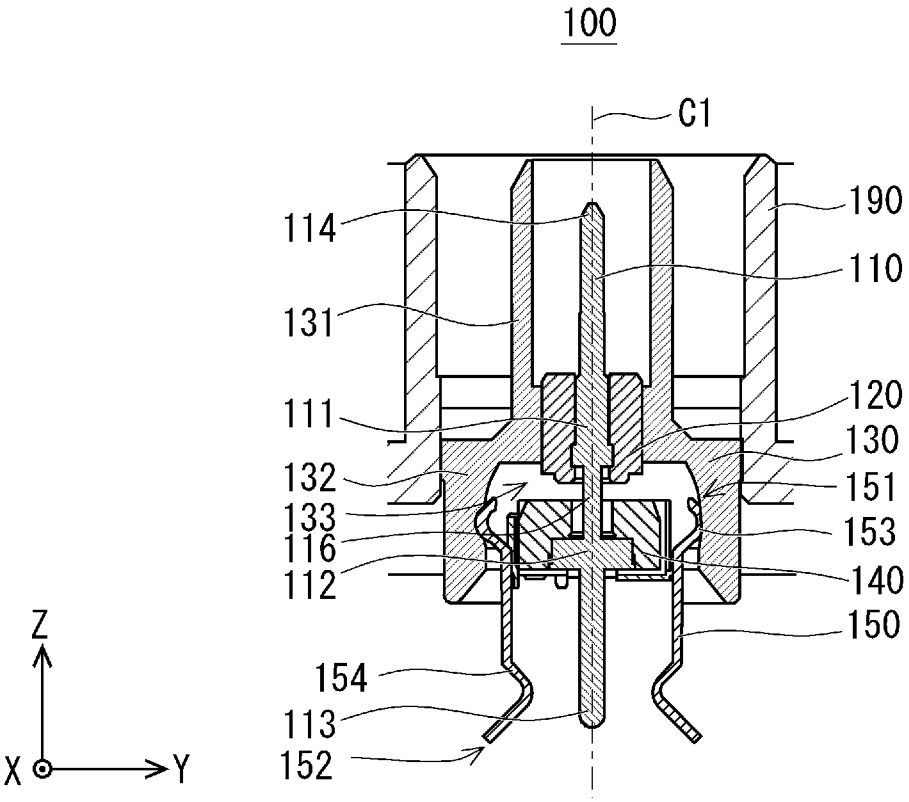
FIG. 7 is a cross-sectional view illustrating the first connector in the connector assembly according to the first embodiment.

A connector assembly according to a first embodiment will be described. FIG. 1 is a side view illustrating the connector assembly according to the first embodiment. FIG. 2 is a perspective view illustrating a first connector in the connector assembly according to the first embodiment. FIG. 3 is a perspective view illustrating a second connector in the connector assembly according to the first embodiment. FIG. 4 is an exploded perspective view illustrating the first connector in the connector assembly according to the first embodiment. FIG. 5 is an exploded perspective view illustrating the second connector in the connector assembly according to the first embodiment. FIG. 6 is a cross-sectional view illustrating the connector assembly according to the first embodiment. FIG. 7 is a cross-sectional view illustrating the first connector in the connector assembly according to the first embodiment.

As shown in FIGS. 1-7, a connector assembly 1 according to this embodiment includes a first connector 100 and a second connector 200. The second connector 200 is connected to the first connector 100. In the connector assembly 1, the first connector 100 and the second connector 200 are, for example, coaxial connectors, and may be used to transmit high-frequency signals. Note that the first connector 100 and the second connector 200 in the connector assembly 1 are not limited to being applied to the transmission of high-frequency signals. In a state in which a mating axis C1 of the first connector 100 matches a mating axis C2 of the second connector 200, the first connector 100 and the second connector 200 mate with each other along the mating axes C1 and C2 that are extended in one direction and are thus connected to each other.

For the sake of making the describing of the connector assembly 1 simpler, an XYZ orthogonal coordinate axis system is introduced. For example, in a state in which the first connector 100 and the second connector 200 mate with each other along the mating axes C1 and C2, a direction in which the mating axes C1 and C2 are extended is a Z-axis direction, a direction from the second connector 200 to the first connector 100 is a positive Z-axis direction, and a direction from the first connector 100 to the second connector 200 is a negative Z-axis direction. A positive Z-axis direction may be referred to also as an upward (or upper) direction, while a negative Z-axis direction may be referred to also as a downward (or lower) direction. The two directions perpendicular to the Z-axis direction are referred to as an X-axis direction and a Y-axis direction. As mentioned above, the indications "XYZ orthogonal coordinate axis system", "upward (or upper) direction", and "downward (or upper) direction" are used for the sake of making the describing of the connector assembly 1 simpler, and do not show directions when the connector assembly 1 is actually used.

The first connector 100 is, for example, a rear case connector. The first connector 100 includes a first signal terminal 110, a first fixed part 120, a first terminal 130, a second fixed part 140, a second terminal 150, and a housing 190.

Figure 8:
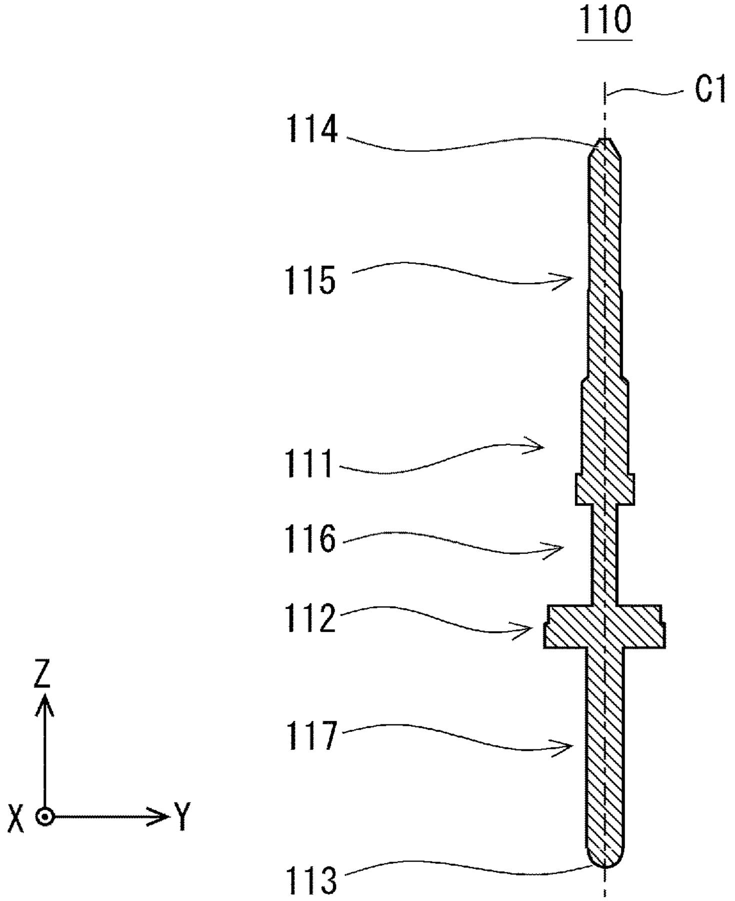
FIG. 8 is a cross-sectional view illustrating a first signal terminal of the first connector in the connector assembly according to the first embodiment.

FIG. 8 is a cross-sectional view illustrating the first signal terminal 110 of the first connector 100 in the connector assembly 1 according to the first embodiment. As shown in FIG. 8, the first signal terminal 110 approximately has a bar shape that is extended in the Z-axis direction. The first signal terminal 110 is extended along the mating axis C1 extending in the Z-axis direction. The length of the first signal terminal 110 in the mating axis direction is, for example, 12.2 [mm]. The dimensions of the main elements shown herein are illustrative only and they are not limited to those shown here. The first signal terminal 110 includes a material of a conductor. The first signal terminal 110 includes a first part 111, a second part 112, a distal end 113, another end 114, a bar-shaped part 115, a bending part 116, and a bar-shaped part 117. Preferably, the first signal terminal 110 is integrally formed.

The distal end 113 is a lower end, that is, an end part of the first signal terminal 110 on the side of the negative Z-axis direction, and the other end 114 is an upper end, that is, an end part of the first signal terminal 110 on the side of the positive Z-axis direction. The other end 114, the bar-shaped part 115, the first part 111, the bending part 116, the second part 112, the bar-shaped part 117, and the distal end 113 are disposed in this recited order from top.

The first part 111 is a part spaced apart from the distal end 113 of the first signal terminal 110. The first part 111 is a part fixed by the first fixed part 120. The first part 111 is a part disposed between the bar-shaped part 115 and the bending part 116.

The first part 111 preferably has a diameter larger than that of the bar-shaped part 115. For example, the diameter of the first part 111 is φ0.8 [mm] and the diameter of the bar-shaped part 115 is φ0.5 [mm]. For example, the first part 111 is press-fit into a penetrating hole of the cylindrical first fixed part 120, and is thus fixed to the first fixed part 120. Accordingly, the first part 111 is an upper press-fit part. The first part 111 may have a diameter the same as that of the bar-shaped part 115 as long as the first part 111 can be fixed to the first fixed part 120. Preferably, the diameter of the first part 111 is larger than that of the bending part 116. The diameter of the bending part 116 is, for example, φ0.45 [mm]. Accordingly, the bending part 16 can be easily bent.

As long as the bending part 116 can be bent, the first part 111 may have a diameter the same as that of the bending part 116.

Figure 10:
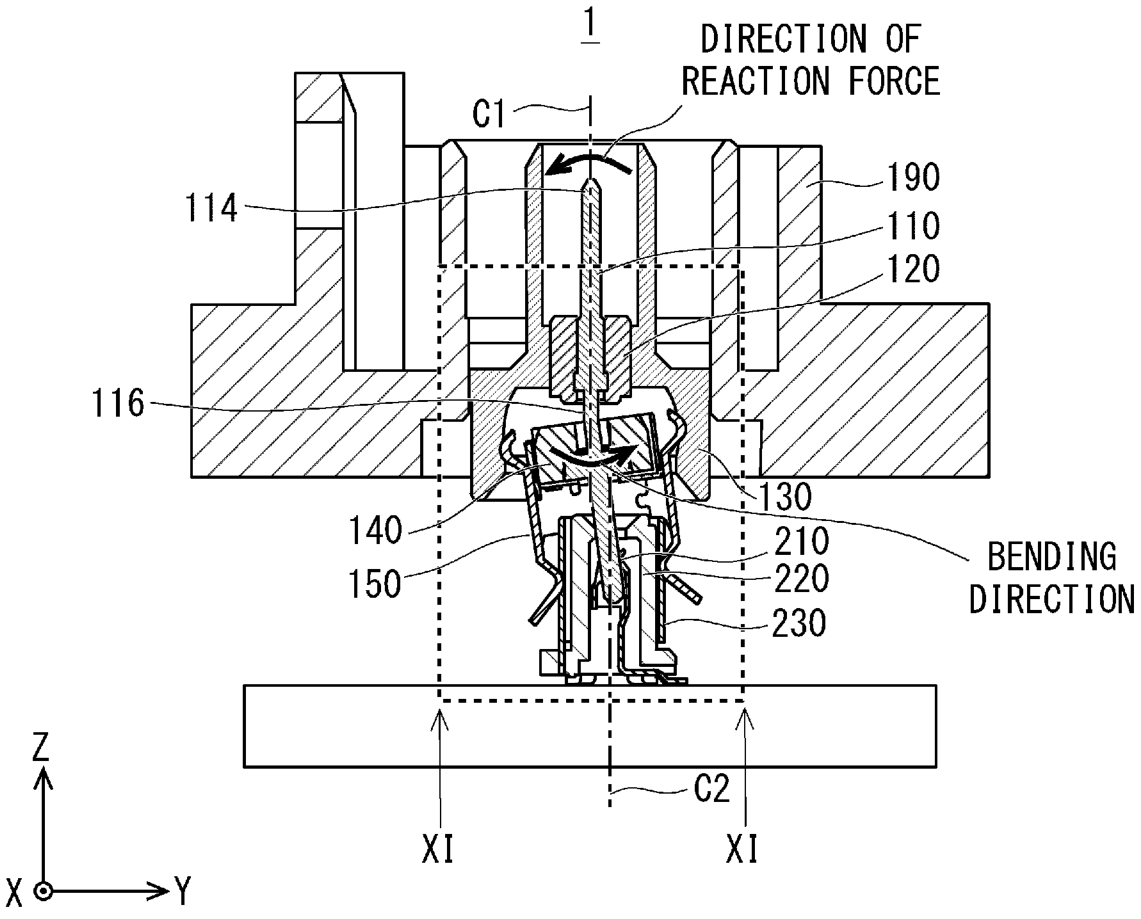
FIG. 10 is a cross-sectional view illustrating a state in which a bending part of the first signal terminal is bent in the connector assembly according to the first embodiment.

The length of the first part 111 in the Z-axis direction, that is, the length of the first part 111 in the mating axis direction, is preferably larger than the length of the bending part 116 in the mating axis direction. For example, the length of the first part 111 in the mating axis direction is 2.15 [mm] and the length of the bending part 116 in the mating axis direction is 1.7 [mm]. Accordingly, as shown in FIG. 10 that will be explained later, it is possible to prevent a reaction force in a direction opposite to the bending direction from occurring in the other end 114 when the bending part 116 is bent. Further, it is possible to prevent members other than the first connector 100 and the second connector 200 from being subjected to adverse effects such as interference when the second connector 200 mates with the first connector 100. As long as the generation of the reaction force can be controlled, it is not necessary that the length of the first part 111 in the mating axis direction be larger than the length of the bending part 116 in the mating axis direction.

Figure 9:
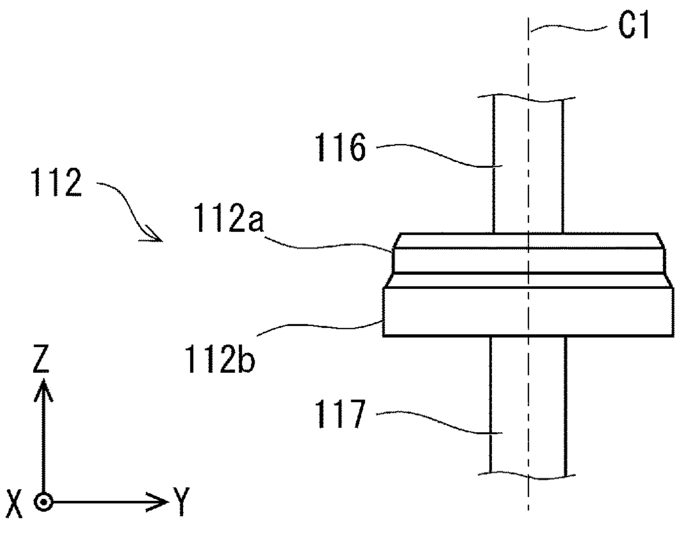
FIG. 9 is a side view illustrating a second part of the first signal terminal in the connector assembly according to the first embodiment.

FIG. 9 is a side view illustrating the second part 112 of the first signal terminal 110 in the connector assembly 1 according to the first embodiment. As shown in FIGS. 8 and 9, the second part 112 is a part disposed between the distal end 113 and the first part 111 of the first signal terminal 110. The second part 112 is a part fixed by the second fixed part 140. The second part 112 is a part disposed between the bending part 116 and the bar-shaped part 117.

The second part 112 has a diameter larger than that of the bending part 116. That is, the diameter of the bending part 116, which is a part of the first signal terminal 110 between the first part 111 and the second part 112, is smaller than the diameter of the second part 112 of the first signal terminal 110. Accordingly, the second fixed part 140 is caught on the second part 112 and is retained. Further, the bending part 116 may be configured in such a way that it can be easily bent. The second part 112 is press-fit into a penetrating hole of the cylindrical second fixed part 140, and is thus fixed to the cylindrical second fixed part 140. Accordingly, the second part 112 is a lower press-fit part. The diameter of the second part 112 is larger than that of the bar-shaped part 117. The diameter of the second part 112 is, for example, φ2 [mm]. The diameter of the bar-shaped part 117 is φ0.5 [mm].

The second part 112 may have a two-stage shape. That is, a step may be formed on a side surface of the second part 112. Specifically, the second part 112 may have an upper stage part **112*a* and a lower stage part 112*b*. The upper stage part 112*a* is an upper part of the second part 112 and the lower stage part 112*b* is a lower part of the second part 112. The upper stage part 112*a* has a columnar shape centered on the mating axis C1. The lower stage part 112*b* has a columnar shape centered on the mating axis C1, and is disposed so as to be closer to the distal end 113 than the upper stage part 112*a*** is.

The diameter of the lower stage part **112*b* is larger than the diameter of the upper stage part 112*a*. For example, the diameter of the lower stage part 112*b* is φ2 [mm] and the diameter of the upper stage part 112*a* is φ1.9 [mm]. Therefore, a step is formed between the upper stage part 112*a* and the lower stage part 112*b*. By making the diameter of the upper stage part 112*a* smaller than the diameter of the lower stage part 112*b*, the second part 112 can be easily press-fit into the second fixed part 140. Further, it is possible to improve position stability when the second part 112 is press-fit into the second fixed part 140. Further, the second fixed part 140 is able to firmly fix the second part 112**.

The circumferential part of the lower stage part **112*b* on the upper surface thereof has a step. Note that the circumferential part of the upper stage part 112*a* on the upper surface thereof may be chamfered. The circumferential part of the lower stage part 112*b* on the upper surface thereof may also be chamfered. Since at least one of these circumferential parts is chamfered, the second part 112 can be easily press-fit into the penetrating hole of the second fixed part 140**.

The diameters of the upper stage part **112*a* and the lower stage part 112*b* are larger than the diameter of the bending part 116. The diameter of the lower stage part 112*b* may be at least twice as large as the diameter of the bending part 116. Accordingly, the second fixed part 140 is able to firmly fix the second part 112. Further, the length of the lower stage part 112*b* in the mating axis direction may be larger than the length of the upper stage part 112*a* in the mating axis direction. Accordingly, the second part 112 can be easily press-fit into the second fixed part 140. Further, the second fixed part 140 is able to firmly fix the second part 112 and improve the function of retaining the second part 112. For example, the length of the lower stage part 112*b* in the mating axis direction is 0.45 [mm] and the length of the upper stage part 112*a*** in the mating axis direction is 0.25 [mm].

The distal end 113 is a lower end of the first signal terminal 110. The distal end 113 may mate with the second signal terminal 210 of the second connector 200. The other end 114 is an upper end of the first signal terminal 110. The other end 114 may be exposed on the opening part in the upper end of the first terminal 130.

The bar-shaped part 115 has a bar shape. The central axis of the bar-shaped part 115 is extended along the mating axis C1. The bar-shaped part 115 projects upward from the first part 111 fixed by the first fixed part 120. The bar-shaped part 115 is positioned inside the first terminal 130. The diameter of the bar-shaped part 115 may be smaller than the diameter of the first part 111.

The bar-shaped part 117 has a bar shape. The central axis of the bar-shaped part 117 is extended along the mating axis C1. The bar-shaped part 117 projects downward from the second part 112 fixed by the second fixed part 140. The bar-shaped part 117 is positioned inside the second terminal 150. The diameter of the bar-shaped part 117 is smaller than the diameter of the second part 112. The diameter of the bar-shaped part 117 may instead be larger than the diameter of the bending part 116.

The bending part 116 has a bar shape. The central axis of the bending part 116 is extended along the mating axis C1. The bending part 116 is a part disposed between the first part 111 and the second part 112. The diameter of the bending part 116 is smaller than the diameter of the second part 112. Further, the diameter of the bending part 116 may be smaller than the diameter of the first part 111. The length of the bending part 116 in the mating axis direction is shorter than the length of the first part 111 in the mating axis direction.

Figure 11:
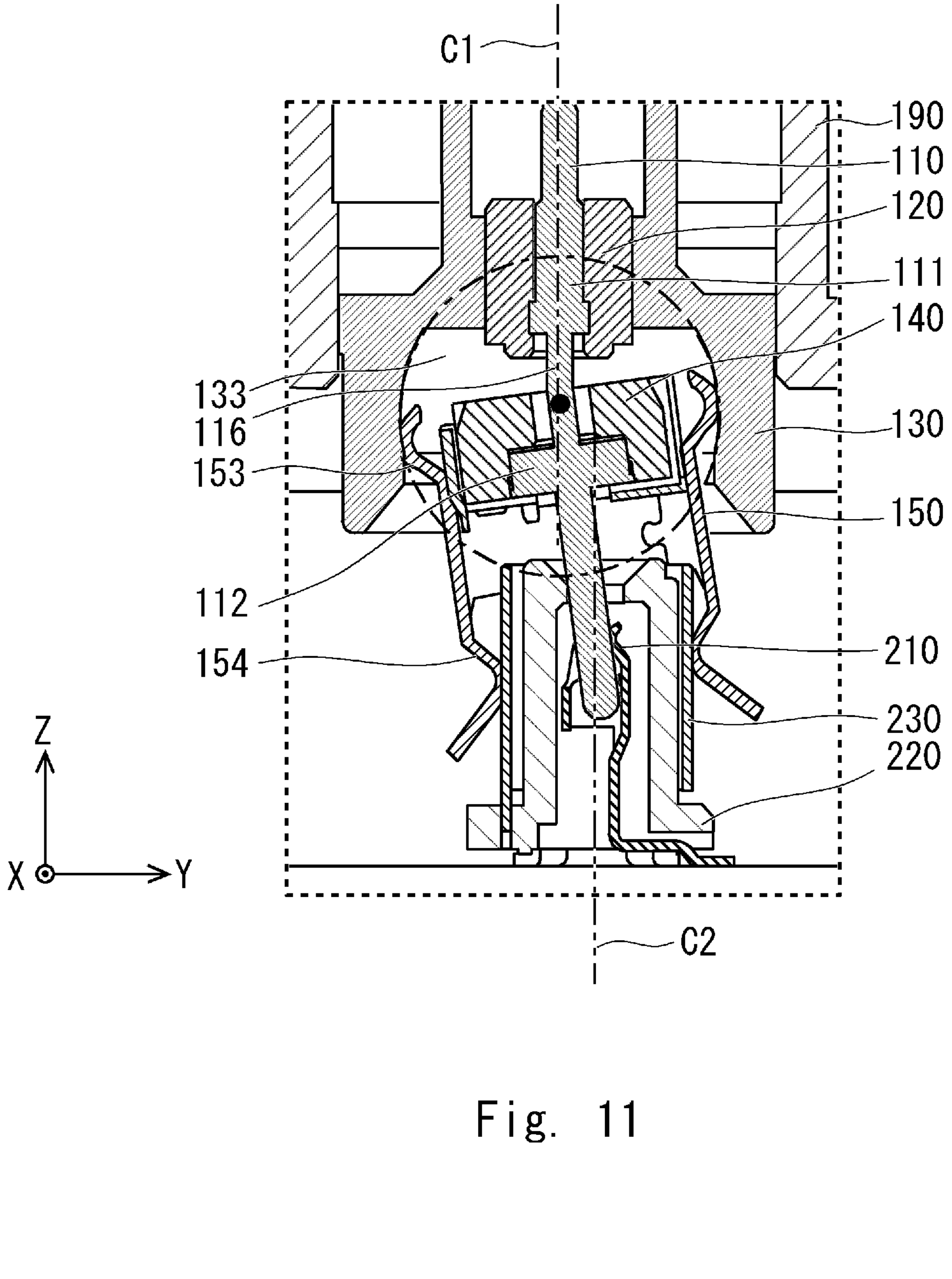
FIG. 11 is a cross-sectional view illustrating a state in which the bending part of the first signal terminal is bent in the connector assembly according to the first embodiment and is an enlarged view of the connector assembly taken along the line XI-XI of FIG. 10.

FIG. 10 is a cross-sectional view illustrating a state in which the bending part 116 of the first signal terminal 110 is bent in the connector assembly 1 according to the first embodiment. FIG. 11 is a cross-sectional view illustrating a state in which the bending part 116 of the first signal terminal 110 is bent in the connector assembly 1 according to the first embodiment, and is an enlarged view of the connector assembly 1 taken along the line XI-XI of FIG. 10. As shown in FIGS. 10 and 11, the bending part 116 can be bent. Specifically, when the first connector 100 is made to mate with the second connector 200, if the mating axis C1 of the first connector 100 and the mating axis C2 of the second connector 200 are displaced from each other, the bending part 116 is bent.

With reference once again to FIGS. 1-7, the first fixed part 120 is, for example, an internal housing. The first fixed part 120 has, for example, a cylindrical shape. The central axis of the first fixed part 120 is extended along the mating axis C1. The first fixed part 120 includes a material of an insulator such as resin. It is sufficient that the first fixed part 120 includes a material of an insulator and the material of the first fixed part 120 is not limited to resin. The first fixed part 120 fixes the first signal terminal 110. Specifically, the first fixed part 120 surrounds the first part 111 of the first signal terminal 110 and fixes the first part 111 therein. For example, the first part 111 of the first signal terminal 110 is press-fit into the penetrating hole of the cylindrical first fixed part 120. Accordingly, the first fixed part 120 fixes the first signal terminal 110. The length of the first fixed part 120 in the mating axis direction where the first part 111 is fixed is larger than the length of the bending part 116 in the mating axis direction.

The first terminal 130 is, for example, a GND terminal. The first terminal 130 includes a material of a conductor. The first terminal 130 has approximately a cylindrical shape, and a concave part 133 is formed in a lower opening. The concave part 133 opens downward. The concave part 133 has a bottom surface and an inner peripheral surface. The bending part 116 of the first signal terminal 110 projects downward from the bottom surface of the concave part 133.

Specifically, the first terminal 130 has a cylindrical shape with a thick lower part and the inner diameter and the outer diameter of the lower part of the first terminal 130 are larger than the inner diameter and the outer diameter of the upper part of the first terminal 130. It can also be said that the first terminal 130 has a shape in which the two cylindrical parts 131 and 132 having a coaxial central axis are connected to each other in the central axis direction. The central axis of the first terminal 130 including the cylindrical parts 131 and 132 is extended along the mating axis C1. The cylindrical part 131 is an upper part of the first terminal 130. The cylindrical part 132 is a lower part of the first terminal 130. The inner diameter and the outer diameter of the cylindrical part 131 are respectively smaller than the inner diameter and the outer diameter of the cylindrical part 132. The lower opening of the cylindrical part 132 is the concave part 133.

The first fixed part 120 is fixed to the lower side of the inner peripheral surface of the cylindrical part 131. The length of the cylindrical part 131 in the mating axis direction is larger than the length of the first fixed part 120 in the mating axis direction. For example, the first fixed part 120 is fit into the lower side of the penetrating hole in the cylindrical part 131. The first signal terminal 110 is disposed in the penetrating hole of the first fixed part 120. Therefore, the first terminal 130 and the first signal terminal 110 are insulated from each other by the first fixed part 120. The first terminal 130 fixes the first signal terminal 110 with the first fixed part 120 being held between the first terminal 130 and the first signal terminal 110.

The lower opening part of the cylindrical part 131 is blocked by the first fixed part 120 and the first signal terminal 110. The other end 114 of the first signal terminal 110 may be positioned inside the cylindrical part 131. The opening part that surrounds the upper opening of the cylindrical part 131 may be exposed on the upper surface of the housing 190. The other end 114 of the first signal terminal 110 may be exposed on the opening surrounded by the upper opening part of the cylindrical part 131.

The lower opening part of the cylindrical part 131 is connected to the upper opening part of the cylindrical part 132. The upper opening of the cylindrical part 132 is blocked by the end surface of the cylindrical part 131, the first fixed part 120, and the first signal terminal 110. Therefore, the bottom surface of the concave part 133 is formed by the end surface of the cylindrical part 131 and the first fixed part 120 in the upper part inside the cylindrical part 132. The bending part 116 of the first signal terminal 110 projects downward from the bottom surface of the concave part 133.

The lower side of the cylindrical part 132 is open. Therefore, the concave part 133 is formed in the lower end part in the first terminal 130. The inner peripheral surface of the concave part 133 includes an inner peripheral surface of the cylindrical part 132. In this manner, the concave part 133 has a bottom surface and an inner peripheral surface. Therefore, the first terminal 130 includes the concave part 133 having the bottom surface and the inner peripheral surface, and fixes the first signal terminal 110 with the first fixed part 120 being held between the first terminal 130 and the first signal terminal 110 in such a way that the first signal terminal 110 projects from the bottom surface.

The second fixed part 140 is, for example, a housing. The second fixed part 140 has a cylindrical shape. The central axis of the second fixed part 140 is extended along the mating axis C1. The second fixed part 140 includes a material of an insulator such as resin. It is sufficient that the second fixed part 140 includes a material of an insulator and the material of the second fixed part 140 is not limited to resin. The second fixed part 140 fixes the second part 112 of the first signal terminal 110. For example, the second fixed part 140 surrounds the second part 112 of the first signal terminal 110 and fixes the second part 112 therein. The inner diameter of the lower part of the second fixed part 140 may be larger than the inner diameter of the upper part of the second fixed part 140. The second part 112 of the first signal terminal 110 is press-fit into the lower part of the second fixed part 140 from below. Accordingly, the second fixed part 140 fixes the second part 112 of the first signal terminal 110. In other words, the second fixed part 140 is caught on the second part 112 and is retained.

The second terminal 150 is, for example, a GND terminal. The second terminal 150 having approximately a tubular shape is centered on the mating axis C1. For example, the second terminal 150 has a cylindrical shape. The second terminal 150 includes a material of a conductor. The second terminal 150 includes a first opening part 151 on the upper side of the second terminal 150 and a second opening part 152 on the lower side of the second terminal 150. The upper end surrounded by the first opening part 151 is open and the lower end surrounded by the second opening part 152 is open.

The first opening part 151 on the upper side of the second terminal 150 includes a diameter increasing part 153 that bulges outward. The diameter increasing part 153 surrounds the upper opening. The diameter increasing part 153 has elasticity. The first opening part 151 may include a plurality of diameter increasing parts 153 divided into a plurality of portions. The diameter increasing part 153 slides on the inner peripheral surface of the concave part 133. The diameter increasing part 153 may slide on the inner peripheral surface of the concave part 133 in a direction of rotation with the mating axis C1 being the rotation axis. Further, the diameter increasing part 153 may slide on the inner peripheral surface of the concave part 133 in the mating axis direction.

The inner peripheral surface of the concave part 133 is curved. Specifically, as shown FIG. 11, for example, the cross-sectional shape of the inner peripheral surface of the concave part 133 formed by a surface including the mating axis C1 may include a part of a circumference centered on one of the points in the bending part 116. The circumference has, for example, a radius R of 2.55 [mm]. The diameter increasing part 153 slides on the inner peripheral surface of the concave part 133. Therefore, the diameter increasing part 153 is positioned on a circumference centered on one of the points in the bending part 116. With this configuration, when the bending part 116 is bent, the diameter increasing part 153 is rotated while it maintains an even spring contact pressure along a trajectory of a contact point with the inner peripheral surface of the concave part 133. Accordingly, it is possible to maintain good GND connection with the inner peripheral surface of the concave part 133.

The second opening part 152 on the lower side of the second terminal 150 includes a reduced diameter part 154 contracted inwardly. The reduced diameter part 154 surrounds the lower opening. The reduced diameter part 154 has elasticity. The second opening part 152 may include a plurality of reduced diameter parts 154 divided into a plurality of portions. The reduced diameter part 154 slides on the outer peripheral surface of the third terminal 230 in the second connector 200. The reduced diameter part 154 may slide on the outer peripheral surface of the third terminal 230 in a direction of rotation with the mating axis C1 being the rotation axis. Further, the reduced diameter part 154 may slide on the outer peripheral surface of the third terminal 230 in the mating axis direction.

The second fixed part 140 is fixed to the inner peripheral surface of the second terminal 150. The first signal terminal 110 is fixed to the penetrating hole of the second fixed part 140. Therefore, the second terminal 150 and the first signal terminal 110 are insulated from each other by the second fixed part 140. The second terminal 150 fixes the first signal terminal 110 with the second fixed part 140 being held between the second terminal 150 and the first signal terminal 110.

The second connector 200 is, for example, an on-board connector. The second connector 200 includes a second signal terminal 210, a third fixed part 220, a third terminal 230, and a board 290.

The second signal terminal 210 includes a material of a conductor. The second signal terminal 210 may be formed in such a way that the distal end 113 of the first signal terminal 110 mates with the second signal terminal 210. For example, the second signal terminal 210 may include a cylindrical part 211 centered on the mating axis C2. The distal end 113 of the first signal terminal 110 is connected to the second signal terminal 210 by being inserted into the cylindrical part 211.

The third fixed part 220 is, for example, a housing. The third fixed part 220 includes a material of an insulator such as resin. It is sufficient that the third fixed part 220 includes a material of an insulator and the material of the third fixed part 220 is not limited to resin. The third fixed part 220 may have, for example, a cylindrical shape. The central axis of the third fixed part 220 is extended along the mating axis C2.

The third fixed part 220 fixes the second signal terminal 210. Specifically, the third fixed part 220 surrounds the cylindrical part 211 in the second signal terminal 210 and fixes the second signal terminal 210 therein. For example, the cylindrical part 211 of the second signal terminal 210 is disposed inside the penetrating hole of the cylindrical third fixed part 220. Accordingly, the third fixed part 220 fixes the second signal terminal 210. The penetrating hole of the third fixed part 220 communicates with the penetrating hole of the cylindrical part 211 of the second signal terminal 210. Therefore, the third fixed part 220 includes a hole with which the distal end 113 of the first signal terminal 110 mates. The first signal terminal 110 mates with the second signal terminal 210 via the penetrating hole of the third fixed part 220. Accordingly, the first signal terminal 110 and the second signal terminal 210 are connected to each other.

The third terminal 230 is, for example, a GND terminal. The third terminal 230 having a tubular shape is centered on the mating axis C2. For example, the third terminal 230 has a cylindrical shape. The third terminal 230 includes a material of a conductor. The third terminal 230 includes a third opening part 231 on the upper side of the third terminal 230 and a fourth opening part 232 on the lower side of the third terminal 230. The third fixed part 220 is fixed to the inner peripheral surface of the third terminal 230. For example, the third fixed part 220 is fit into the penetrating hole of the third terminal 230. The second signal terminal 210 is disposed in the penetrating hole of the third fixed part 220. Therefore, the third terminal 230 and the second signal terminal 210 are insulated from each other by the third fixed part 220. The third terminal 230 fixes the second signal terminal 210 with the third fixed part 220 being held between the third terminal 230 and the second signal terminal 210. The second connector 200 is inserted into the second terminal 150 from the third opening part 231.

Next, an operation of the connector assembly 1 according to this embodiment will be described. First, an operation in a case in which the mating axis C1 of the first connector 100 and the mating axis C2 of the second connector 200 match each other will be described. When the mating axis C1 and the mating axis C2 match each other, the second connector 200 is positioned just below the first connector 100. Then, the third terminal 230 in the second connector 200 is inserted into the second terminal 150 of the first connector 100. At this time, the outer peripheral surface of the third opening part 231 of the third terminal 230 is slid in the reduced diameter part 154 of the second opening part 152 of the second terminal 150. Specifically, the outer peripheral surface of the third opening part 231 is slid in the mating axis direction in the reduced diameter part 154 of the second opening part 152. Accordingly, the second terminal 150 is connected to the third terminal 230.

At the same time, the distal end 113 of the first signal terminal 110 is inserted into the penetrating hole of the third fixed part 220 and is further connected to the second signal terminal 210. Specifically, the distal end 113 of the first signal terminal 110 is made to mate with the cylindrical part 211 of the second signal terminal 210. Accordingly, the first signal terminal 110 is connected to the second signal terminal 210.

Next, an operation in a case in which the mating axis C1 of the first connector 100 and the mating axis C2 of the second connector 200 are displaced from each other will be described. As shown in FIGS. 10 and 11, for example, a case in which the mating axis C1 and the mating axis C2 are both parallel to the mating axis direction but the mating axis C1 is displaced in the negative Y-axis direction with respect to the mating axis C2 will be described. In this case, the third terminal 230 in the second connector 200 is inserted into the second terminal 150 of the first connector 100. Then, the upper part of the second terminal 150 is tilted in the negative Y-axis direction and the lower part of the second terminal 150 is tilted in the positive Y-axis direction. Then, the diameter increasing part 153 is rotated about one of the points in the bending part 116. Accordingly, the diameter increasing part 153 slides on the inner peripheral surface of the concave part 133.

At the same time, the distal end 113 of the first signal terminal 110 is inserted into the penetrating hole of the third fixed part 220. Then, the distal end 113 of the first signal terminal 110 is made to proceed so that the distal end 113 mates with the hole of the second signal terminal 210. Then, the bending part 116 is bent about one of the points in the bending part 116. The first signal terminal 110 can be connected to the second signal terminal 210 by bending the bending part 116.

Figure 12:
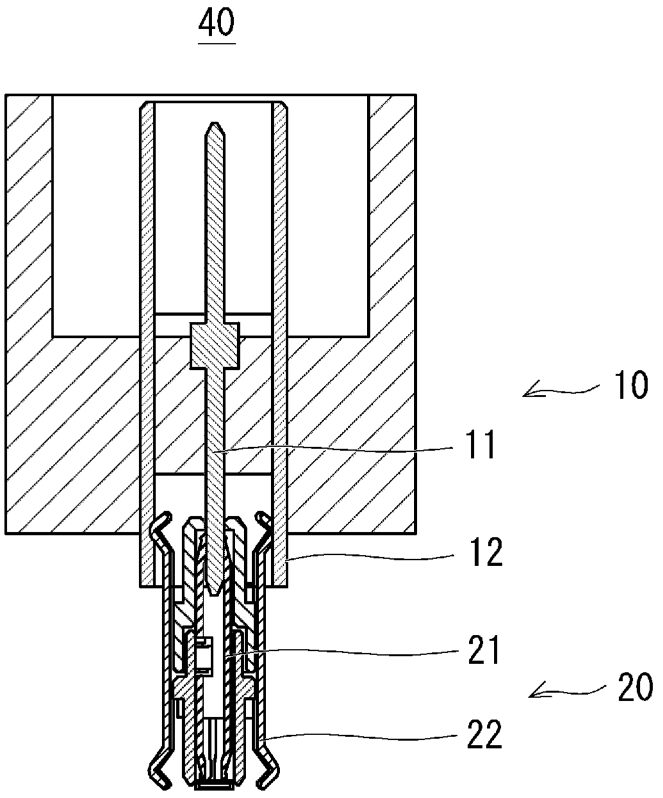
FIG. 12 is a cross-sectional view illustrating a mating connector and a relay connector in a floating connector according to a comparative example.
Figure 13:
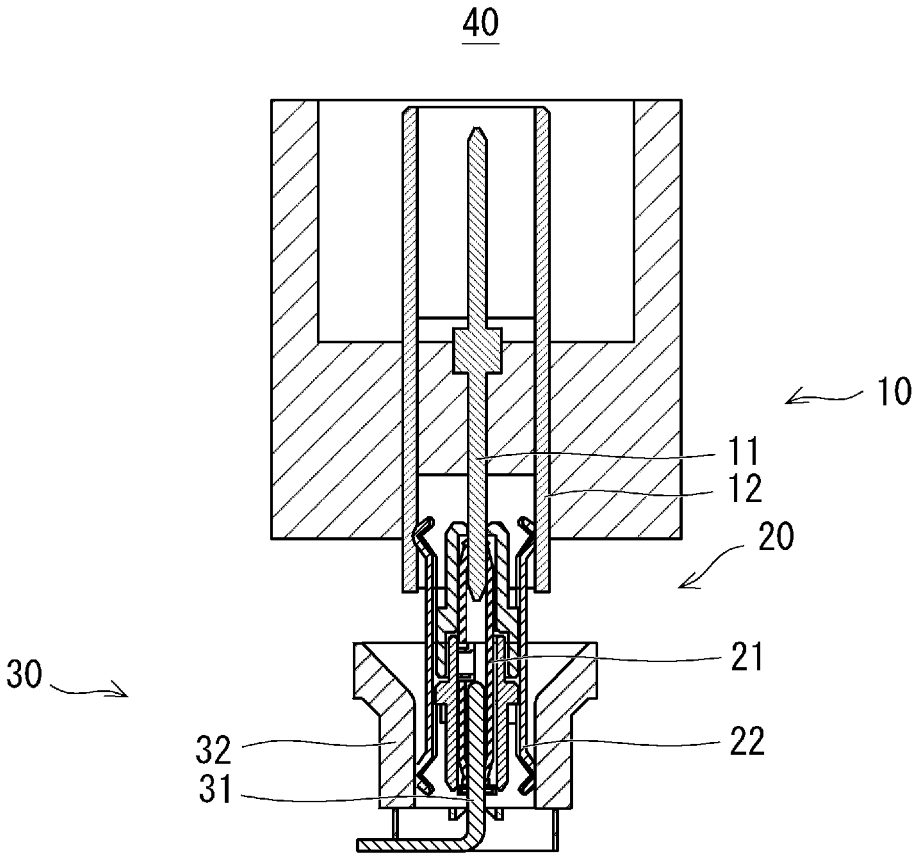
FIG. 13 is a cross-sectional view illustrating a connection connector that is connected to the mating connector via the relay connector in the floating connector according to the comparative example.

Next, prior to giving the description of effects of this embodiment, a floating connector 40 according to a comparative example and problems of the comparative example will be described. After that, effects according to this embodiment as compared to the comparative example will be described. FIG. 12 is a cross-sectional view illustrating a mating connector 10 and a relay connector 20 in a floating connector 40 according to the comparative example. FIG. 13 is a cross-sectional view illustrating the connection connector 30 connected to the mating connector 10 via the relay connector 20 in the floating connector 40 according to the comparative example. As shown in FIGS. 12 and 13, a connector assembly according to the comparative example is the floating connector 40, and includes the mating connector 10, the relay connector 20, and the connection connector 30.

In the comparative example, in order to make this connector assembly function as a connector assembly having a floating structure, the mating connector 10 holds the relay connector 20 by only a spring contact. Therefore, it is possible that the relay connector 20 may fall from the mating connector 10 when the connector assembly is used and while the connector assembly is being transported. Further, the relay connector 20 is not fixed and thus there is a room for it to move freely within a predetermined space. Therefore, the reference position of the relay connector 20 cannot be determined and the relay connector 20 may move. Furthermore, when the connection connector 30 is detached from the mating connector 10, it is possible that the mating connector 10 may not be able to hold the relay connector 20. In this case, it is possible that the relay connector 20 may slip out of the connector assembly 10 following the connection connector 30.

Next, effects of the connector assembly 1 according to this embodiment will be described. In this embodiment, the second terminal 150 having the function of the relay connector 20 is prevented from slipping out from the first connector 100 that includes the first terminal 130 and the like. Specifically, the diameter of the second part 112 of the first signal terminal 110 is made larger than the diameter of the bending part 116, and the second fixed part 140 and the second terminal 150 are caught on the second part 112 and retained. In particular, the second fixed part 140 is caught on the thick lower stage part **112*b* of the second part 122 so as to be retained more firmly. Accordingly, it is possible to prevent the second terminal 150 from falling from the first connector 100 when the connector assembly 1 is used and while the connector assembly 1** is being transported.

Further, the second part 112 is configured to have an upper and lower two-stage structure, and the diameter of the upper stage part **112*a* is formed to be smaller than the diameter of the lower stage part 112*b*. This makes press-fitting of the second part 112 into the second fixed part 140** easy.

Further, in this embodiment, the diameter of the bending part 116 in the first signal terminal 110 is made smaller than the diameter of the second part 112. Accordingly, the bending part 116 in the first signal terminal 110 can be curved and the positional displacement between the first connector 100 and the second connector 200 can be absorbed.

In this embodiment, the length of the first fixed part 120 in the mating axis direction is made larger than the length of the bending part 116 in the mating axis direction. Accordingly, when the bending part 116 is bent, it is possible to prevent a reaction force of the bending from occurring in the other end 114 of the first signal terminal 110. Further, the inner peripheral surface of the concave part 133 is formed to have a curved shape with R, whereby the diameter increasing part 153 can be slid on the inner peripheral surface of the concave part 133 while it maintains an even spring contact pressure.

Further, in this embodiment, the number of elements that correspond to the relay connector can be reduced, the cost of the connector assembly 1 can be reduced, and the size of the connector assembly 1 can be reduced.

While the embodiments of the present disclosure have been described above, the present disclosure includes any suitable modification that does not impair the object and the advantages of the present disclosure, and, furthermore, the present disclosure is not limited to the embodiments described above. Further, configurations in the first embodiment may be combined with each other as appropriate.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A connector assembly comprising:

a first connector; and a second connector connected to the first connector, wherein the first connector comprises:

a first signal terminal that is extended along a mating axis;

a first fixed part which fixes a first part spaced apart from a distal end of the first signal terminal;

a first terminal in which a concave part having a bottom surface and an inner peripheral surface is formed, the first terminal fixing the first signal terminal with the first fixed part being held between the first terminal and the first signal terminal in such a way that the first signal terminal projects from the bottom surface;

a second fixed part which fixes a second part between the distal end of the first signal terminal and the first part; and a second terminal having a tubular shape, centered on the mating axis, and having one first opening part and another second opening part, and inside which the first signal terminal is fixed with the second fixed part being held between the first signal terminal and the second terminal, the second connector comprises:

a second signal terminal;

a third fixed part that has a hole with which the distal end of the first signal terminal mates and fixes the second signal terminal; and a tubular third terminal which includes one third opening part and another fourth opening part and inside which the second signal terminal is fixed with the third fixed part being held between the tubular third terminal and the second signal terminal, the second connector is inserted into the second terminal from the third opening part, and since a diameter of a bending part between the first part and the second part of the first signal terminal is smaller than a diameter of the second part of the first signal terminal, the second fixed part is caught on the second part and is retained.

2. The connector assembly according to claim 1, wherein the second part comprises:

an upper stage part centered on the mating axis; and a lower stage part centered on the mating axis and provided so as to be closer to the distal end than the upper stage part is, and a diameter of the lower stage part is larger than a diameter of the upper stage part.

3. The connector assembly according to claim 2, wherein a length of the lower stage part in the mating axis direction is larger than a length of the upper stage part in the mating axis direction.

4. The connector assembly according to claim 2, wherein the diameter of the lower stage part is at least twice as large as the diameter of the bending part.

5. The connector assembly according to claim 1, wherein a length of the first fixed part in the mating axis direction is larger than a length of the bending part in the mating axis direction.

6. The connector assembly according to claim 1, wherein the first opening part includes a diameter increasing part having elasticity, the diameter increasing part slides on an inner peripheral surface of the concave part, and a cross-sectional shape of the inner peripheral surface of the concave part formed by a surface including the mating axis includes a part of a circumference centered on a point in the bending part.

* * * * *